J. H. IRWIN.
Acoustic Telegraphs.
No. 212,145.  Patented Feb. 11, 1879.
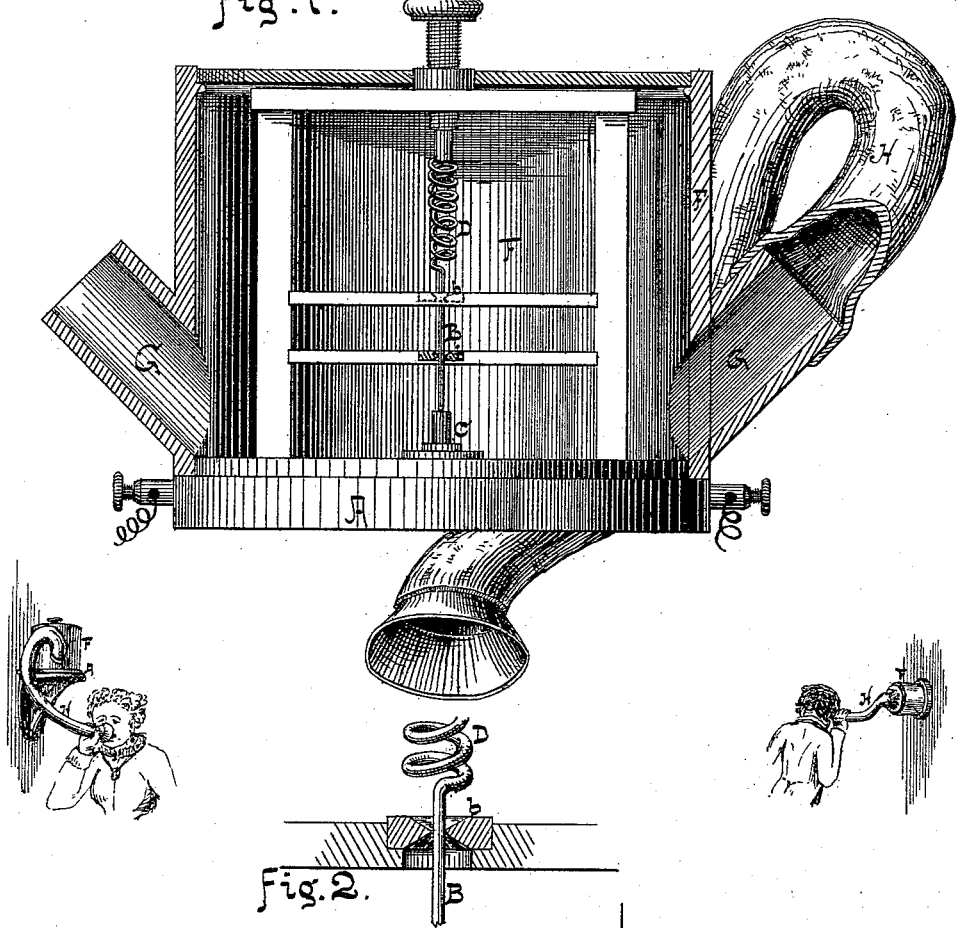
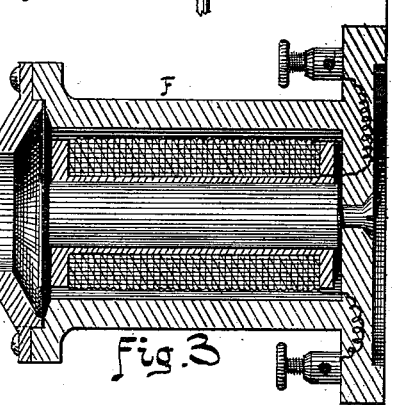
Attest
A. B. Smith
N. B. Magruder
Inventor
John H. Irwin
By his Atty
R. D. O. Smith

UNITED STATES PATENT OFFICE.

JOHN H. IRWIN, OF PHILADELPHIA, PENNSYLVANIA.

IMPROVEMENT IN ACOUSTIC TELEGRAPHS.

Specification forming part of Letters Patent No. 212,145, dated February 11, 1879; application filed August 15, 1878.

*To all whom it may concern:*

Be it known that I, JOHN H. IRWIN, of Philadelphia, in the county of Philadelphia and State of Pennsylvania, have invented new and useful Improvements in Acoustic Telegraphs, of which the following is a true and exact description.

This invention relates to that class of acoustic telegraphs whereby articulated sounds are reproduced at a distance from the speaker and made audible to a listener; and it consists, first, of an inclosing-case unconnected with the operative parts of the instrument or the supports for the same, to protect the instrument from wind; second, of a non-resonant inclosing-case for the transmitting-instrument, unconnected with the operative parts of the instrument or the supports for the same, whereby the sound-waves may be caused to fall upon the sensitive medium with less interference from echo or other extraneous sounds, and thereby it is rendered possible to produce the desired results with the voice pitched in a lower tone than heretofore, and with a corresponding advantage of privacy for the speaker.

For convenience, I represent in my drawings a transmitter of the type invented by me, and particularly described in a former application, though it is manifest that similar advantage will ensue upon its use with any other style of or type of instrument. Therefore, I do not propose to limit myself to instruments of that particular type, but to apply it to any instrument for transmitting articulate sounds.

That others may fully understand my invention, I will more particularly describe it, having reference to the accompanying drawings, wherein—

Figure 1 is an elevation of my transmitter, with the inclosing-case in section, showing also marginal figures, representing the instrument in use. Fig. 2 is a section of one of the jeweled bearings. Fig. 3 is a longitudinal section of the receiver.

A is the base, and B C are the needles through which the electric current passes, and at the contact ends whereof it is transformed into undulations by the disturbing action of sound-waves. The needle B is suspended from the top of the instrument by means of a detachable coiled-wire spring, D, and is provided with an adjusting device at the top, whereby the needle B may be raised or lowered to regulate the force of its contact with the needle C. The needle B passes also through delicate bearings $b$ $b$, which may advantageously be made of jewels and supported in cross-bars $d$ $d$, or otherwise, as most convenient. The needle B may be very delicate, in fact of uniform size with the spring. It should be highly polished, so as to prevent the least possible frictional contact with the bearings. To secure durability, the end of the needle should be of platinum and it should be reduced to a point.

The needle C is fixed, and may be also of platinum, in which case a socket must be formed for the point of the needle B, and conforming exactly thereto. When carbon is employed for the needle C, the action of the needle B, coupled with the electrical current, soon causes the point of the needle B to form for itself a socket in the carbon, and the best results do not seem to appear until the two needles become thus adapted to each other.

A surrounding case or jacket, F, is placed over the transmitter. This case or jacket may be composed of any imperfectly sonorous or non-sonorous substance; or it may be made of any convenient material and lined with a non-sonorous substance, like paper, soft rubber, &c. Soft rubber I think will furnish, perhaps, the best material for this purpose.

At opposite sides there may be openings provided with hollow necks G, or mouth-pieces, for the admission of the sound-waves; and from experiments with this instrument and in analogous directions, I am convinced that the best results are obtained when the sound-waves impinge at an angle of forty-five degrees to the sensitive plane; and I believe it may be advantageous to provide a similar opening on the opposite side for the escape of the reflected waves.

For the accommodation of those for whom the instrument may be placed at an inconvenient height, I provide a short flexible tube, H, which is attached to the neck G, and has at its end a mouth, which may be adapted either to speaking or listening, as desired, whereby the instrument, however it may be placed, is adjusted to the convenience of the operator.

Having described my invention, I claim as new, and desire to secure by Letters Patent, the following:

1. Combined with the transmitter of an acoustic telegraph, a non-resonant jacket to inclose the same, as and for the purpose substantially as set forth.

2. A non-resonant jacket provided with hollow necks or openings, combined with a transmitter for an acoustic telegraph.

J. H. IRWIN.

Witnesses:
CHAS. F. R. HEUCKEROLL,
R. D. O. SMITH.